United States Patent Office 3,082,219
Patented Mar. 19, 1963

3,082,219
METHOD FOR THE PREPARATION OF
Δ¹⁶-20-KETO STEROIDS
Harry L. Slates, Roselle, and Norman L. Wendler, Summit, N.J., assignors to Merck & Co., Inc., Rahway, N.J., a corporation of New Jersey
No Drawing. Filed Mar. 11, 1958, Ser. No. 720,533
6 Claims. (Cl. 260—397.3)

This invention is concerned generally with steroid compounds and with processes for preparing them. More particularly, it relates to a novel process for preparing Δ¹⁶-20-keto steroids.

The Δ¹⁶-20-keto-pregnenes are valuable starting materials for the preparation of physiologically active 16-substituted adrenocortical hormones such as triamcinalone and may be represented by the following structural formula:

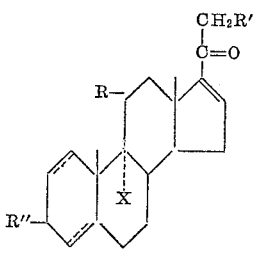

In which R may be —H, —OH, or =O, or a derivative thereof, R' may be H, —OH or acyloxy, and X may be —H or a halogen. The dotted valences in ring A indicate that there may or may not be double bonds between the indicated carbon atoms.

Prior attempts to directly prepare Δ¹⁶-20-keto-pregnenes from 17α-hydroxy-20-keto-pregnanes have been unsatisfactory because of poor over-all yields, inaccessibility of starting materials and undesirable reactions at other centers in the steroid molecule.

It has now been found that a novel and unique labilization to dehydration by acidic reagents is imparted to 17α-hydroxy-20-keto steroids by the electromeric effects induced by a 20-hydrazone type derivative. It is to be noted that treatment of a 17α-hydroxy-20-keto steroid by a wide variety of acidic reagents does not perform the desired dehydration, nor does the act of formation of a hydrazone type derivative and its subsequent removal afford a Δ¹⁶-unsaturated 20-keto steroid.

One of the primary objectives of this invention is to provide a simplified and practicable procedure for preparing Δ¹⁶-20-keto-pregnenes from the known 17α-hydroxy-20-keto-pregnanes. A further objective of this invention is a simple and practicable procedure for preparing Δ¹⁶-21-oxygenated-20-keto-pregnenes from 17α-hydroxy - 21-acyloxy-20-keto-pregnanes. The present invention has the important advantage of producing higher conversion yields and of being applicable to a wider variety of compounds than the methods heretofore available. The invention may be applied to pregnanes and to allopregnanes as well.

It has been discovered in accordance with the present invention that Δ¹⁶-20-keto-pregnenes are produced by first reacting a 17α-hydroxy-20-keto-pregnane with for example semicarbazide to produce the corresponding 20-semicarbazone derivative and then treating the latter compound in the presence of an acidic agent, followed by removal of the semicarbazone residue, to produce the desired Δ¹⁶-20-keto-pregnenes. These reactions can be represented by chemical formulae, insofar as the changes in the pregnane side chain are concerned, as follows:

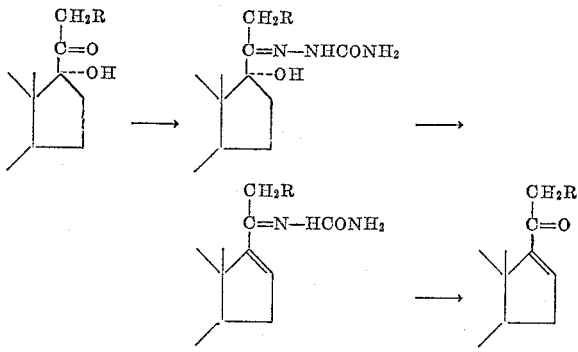

In the preceding equations R may represent hydrogen, or hydroxyl, or an acyloxy radical. It is a further novel feature of this invention that other substituents in rings A, B, and C, such as hydroxyls, ketones, acyloxy radicals, and double bonds are retained unaltered by the reactions set forth herein.

As a preferred embodiment of this invention the semicarbazone is employed as the hydrazone type derivative of choice.

In preparing the required semicarbazone derivative referred to above, the method of Jones and Robinson [J. Org. Chem., 21, 586 (1956)] is suitable. The dehydration of the semicarbazone derivative is most conveniently carried out at between 10 and 150° C. in a suitable solvent. Suitable solvents for the reaction are lower aliphatic acids. The reaction is, in one embodiment of this invention, most conveniently carried out in refluxing acetic acid. The time of reaction may vary between 15 minutes and 24 hours depending upon the compound. Using the preferred conditions, the reaction is usually complete in from one to four hours. Other acidic reagents, such as zinc chloride, boron trifluoride, para toluenesulfonic acid and aluminum chloride in a suitable solvent, such as a lower aliphatic acid, may be employed. The time and temperature may be varied by the acidic agent used. Furthermore, other substituted hydrazone derivatives such as the carbethoxyhydrazone, phenylhydrazone, substituted phenylhydrazones and the like may be utilized. The product can be conveniently obtained by removal of the semicarbazone residue by exchange with pyruvic acid or by acid hydrolysis.

The following specific examples serve to illustrate but are not intended to limit the present invention:

EXAMPLE 1

3α-acetoxy-Δ¹⁶-pregnene-11,20-dione.—A solution of 525 mg. of 3α-acetoxy-17α-hydroxy-pregnane-11,20-dione in 30 ml. of methanol was treated with a solution of 300 mg. of semicarbazide and 200 mg. of semicarbazide-hydrochloride in a minimum volume of water and refluxed for 4 hours. The reaction mixture was concentrated in vacuo, water was added to crystallization, and the 3α-acetoxy-17α-hydroxy-pregnane-11,20-dione - 20 - semicarbazone, 550 mg., was isolated by filtration.

A solution of 0.55 g. of 3α-acetoxy-17α-hydroxy-pregnane-11,20-dione 20-semicarbazone in 30 ml. of acetic acid was refluxed for 16 hours. The reaction mixture was concentrated in vacuo to a volume of ca. 6 ml. and treated with 3 ml. of water and 1.5 ml. of pyruvic acid and allowed to stand at room temperature for 18 hours and then heated at 60° for two hours. After dilution with water, the product was extracted with chloroform, and the chloroform solution was washed with water, 5% sodium bicarbonate solution, water, and finally dried over magnesium sulfate. The solvent was removed in vacuo and the residue was chromatographed on neutral alumina and eluted with petroleum ether-benzene-chloroform mixtures. The fractions corresponding to 50% petroleum ether-benzene afforded, after crystallization from ether, 200 mg. of 3α-acetoxy-Δ¹⁶-pregnene-11,20-dione, M.P. 167–169°, $$\lambda_{max.}^{CH_3OH}\ 235\ m\mu,\ E=9,500$$

From the fractions corresponding to 1–5% chloroform-benzene there was obtained 155 mg. of 3α-acetoxy-17α-hydroxy-pregnane-11,20-dione, which may be converted to the 20-semicarbazone and recycled.

EXAMPLE 2

*3α,21-diacetoxy-Δ¹⁶-pregnene-11,20-dione.*—A solution of 950 mg. of 3α,21-diacetoxy-17α-hydroxy-pregnane-11,20-dione in 60 ml. of methanol was treated with a solution of 600 mg. of semicarbazide and 400 mg. of semicarbazide-hydrochloride in a minimum volume of water and refluxed for 4 hours. The reaction mixture was concentrated in vacuo, water added to crystallization, and the 3α,21 - diacetoxy - 17α - hydroxy-pregnane-11,20-dione-20-semicarbazone, 1.0 g., was isolated by filtration.

A solution of 1.0 g. of 3α,21-diacetoxy-17α-hydroxy-pregnane-11,20-dione-20-semicarbazone in 60 ml. of acetic acid was refluxed for 1 hour. The reaction mixture was then treated as described in Example 1. There was obtained 200 mg. of 3α,21-diacetoxy-Δ¹⁶-pregnene-11,20-dione, M.P. 131–132° C., $$\lambda_{max.}^{CH_3OH}\ 247\ m\mu,\ E=9,900$$

EXAMPLE 3

*21 - acetoxy-Δ⁴,¹⁶-pregnadiene-3,11,20-trione.*—A solution of 5.0 g. of cortisone acetate in 200 ml. of methanol was treated with 3 g. of semicarbazide and 2 g. of semicarbazide-hydrochloride in a minimum volume of water and refluxed for 4 hours. The reaction mixture was concentrated in vacuo and the cortisone-3,20-bis-semicarbazone, 6.1 g., was isolated by filtration.

A solution of 5.0 g. of cortisone acetate-3,2-bis-semicarbazone in 100 ml. of acetic acid was refluxed for 1 hour. The reaction mixture was then treated as described in Example 1. There was obtained 1.37 g. of 21-acetoxy-Δ⁴,¹⁶-pregnadiene-3,11,20-trione, M.P. 186–187° C., $$\lambda_{max.}^{CH_3OH}\ 237-238\ m\mu,\ E=25,200$$

EXAMPLE 4

*3α - acetoxy-Δ⁵,¹⁶-pregnadiene-20-one.*—A solution of 3α-acetoxy-17α-hydroxy-Δ⁵-pregnene 20-one [Hegner and Reichstein, Helv., 24, 828 (1941)] 200 mg., in 15 ml. of methanol was treated with a solution of 120 mg. of semicarbazide and 100 mg. of semicarbazide-hydrochloride in a minimum volume of water, and refluxed for 4 hours. The reaction mixture was concentrated in vacuo, water added to crystallization, and the 3α-acetoxy - 17α - hydroxy - Δ⁵ - pregnene - 20 - one - 20-semicarbazone, 110 mg., was isolated by filtration.

A solution of 100 mg. of 3α-acetoxy-17α-hydroxy-Δ⁵-pregnene-20-one-20-semicarbazone in 6 ml. of acetic acid was refluxed for 1 hour. The reaction mixture was then treated as described in Example 1. There was obtained 37 mg. of 3α-acetoxy-Δ⁵,¹⁶-pregnadiene-20-one, M.P. 173–175°.

This latter substance has been converted by the action of piperidine and aqueous potassium hydroxide to 16α-piperidino-3α-hydroxy-Δ⁵-pregnene-20-one, a compound which exhibits hypotensive activity as well as bradycrotic and specific contra-accelerator action.

EXAMPLE 5

*Pregna-4,16-dien-21-ol - 3,11,20 - trione 21 acetate.*—Cortisone-21-acetate-3,20-bis-semicarbazone (50 g.) and zinc chloride (50 g.) in acetic acid (1330 ml.) and acetic anhydride (133 ml.) were heated on the steam bath with stirring for 3 hours. Pyruvic acid (120 ml.) and water (700 ml.) were added and heating continued for an additional 2 hours. The reaction mixture was cooled, diluted with water and extracted with chloroform. The chloroform extracts were washed with sodium bicarbonate solution, dried and concentrated under vacuum of a viscous oil. Upon addition of methanol, the oil crystallized to yield 16 g. of product;

$$U.V.\ \lambda_{max.}^{MeOH}\ 2375\ A,\ E_{1\ cm.}^{1\%}\ 631$$

Chromatography showed the product to consist of two compounds, pregna-4,16-dien-21-ol-3,11,20-trione and the corresponding 21-acetate. Acetylation of the former gave authentic pregna-4,16-dien-21-ol-3,11,20-trione 21-acetate, M.P. 189.5–191.5.

EXAMPLE 6

*Pregna - 4,16 - dien-21-ol-3,11,20-trione 21-acetate.*—Cortisone 21-acetate bis-semicarbazone (2 g.) was suspended in 25 ml. of 45% boron trifluoride etherate. Acetic acid (10 ml.) was added and the reaction mixture allowed to stand at room temperature approximately 24 hours. The reaction mixture was diluted with 300 ml. water and the insoluble filtered off and washed with water. The product was reversed in the usual way by dissolving in acetic acid and adding pyruvic acid and water and heating on the steam bath for 2 hours. The $$U.V.\ (\lambda_{max.}^{MeOH}\ 2375,\ E_{1\ cm.}^{1\%}\ 510)$$

of the product indicated approximately 48% dehydration. This was confirmed by chromatography to afford authentic pregna - 4,16 - dien - 21 - ol - 3,11,20 - trione 21-acetate.

EXAMPLE 7

*Pregna-4,16-dien-20-ol-3,11,20-trione 21-acetate.*—Cortisone 21-acetate bis-semicarbazone (2 g.) was refluxed under N₂ for one hour in 120 ml. of acetic acid containing 0.5 g. para toluenesulfonic acid. At the end of the reflux period, the bulk of the solvent was removed in vacuo. The residue was diluted with water and filtered. The insoluble material was dissolved in 20 ml. of acetic acid; 10 ml. of water and 5 ml. of pyruvic acid was added. After standing overnight, the reaction mixture was diluted with water and extracted with chloroform. The chloroform extract was washed with water and sodium bicarbonate solution, dried and concentrated in vacuo. The $$U.V.\ (\lambda_{max.}^{MeOH}\ 2375,\ E_{1\ cm.}^{1\%}\ 528)$$

indicated 55% dehydration. The product was obtained by chromatography on alumina.

EXAMPLE 8

*Pregna-4,16-dien-21-ol-3,11,20-trione 21-acetate.*—Cortisone 21-acetate (1.5 g.) was heated for one hour and 20 minutes with 1.5 g. of anhydrous aluminum chloride in 40 ml. of acetic acid. At the end of the heating period, 20 ml. of water and 5 ml. of pyruvic acid was added. The reaction mixture stood at room temperature approximately 6 hours. It was diluted with water and extracted with chloroform. The chloroform extract was washed with sodium bicarbonate solution, dried and concentrated in vacuo. Chromatography of the residue indicated it to be essentially the Δ¹⁶-21-alcohol along with unreacted starting material.

EXAMPLE 9

*Pregna-1,4,16-trien-21-ol-3,11,20 trione - 21 - acetate (Δ¹⁶ prednisone acetate).*—Pregna-1,4-dien-17α,21-diol-3,11,20-trione 21 acetate bis-semicarbazone (1.5 g.) was heated for 3 hours on the steam bath with 1.5 g. zinc chloride in 40 ml. acetic acid and 5 ml. of acetic anhydride. The reaction mixture was diluted with 20 ml. water and 5 ml. of pyruvic acid. It was allowed to stand overnight at room temperature and then heated for 2 hours on the steam bath. The reaction mixture was diluted with 550 ml. water and extracted with chloroform. The product, pregna-1,4,16-trien-21-ol-3,11,20-trione 21-acetate was obtained on removal of the chloroform. The ultra violet absorp-spectra $$(\lambda_{max.}^{MeOH} \ 2375, \ E_{1 \ cm.}^{1\%} \ 517)$$

indicated approximately 47% dehydration. The pure compound was isolated by chromatography.

EXAMPLE 10

*Pregna-4,9(11),16-trien-21-ol-3,11,20 - trione 21 - acetate.*—Pregna-4,9(11)-dien-17α,21-diol-3,11,20-trione 21-acetate bis-semicarbazone (1.5 g.) was heated in 40 ml. acetic acid with 1.5 g. zinc chloride on the steam bath for 3 hours. The reaction mixture was poured into 400 ml. of water, the insoluble filtered and washed with water. After drying in vacuo, the product was dissolved in 50 ml. acetic acid, 25 ml. water and 5 ml. pyruvic acid and stirred at room temperature overnight. The insoluble was filtered off, the filtrate diluted with water and extracted with chloroform. Evaporation of the chloroform afforded a crystalline product which by ultra violet absorption spectra $$(\lambda_{max.}^{MeOH} \ 2385, \ E_{1 \ cm.}^{1\%} \ 531)$$

indicated approximately 50% dehydration. Chromatography gave the 21-acetate and the 21-alcohol of the $\Delta^{16}$ compound.

EXAMPLE 11

*Pregna-4,16-dien-21-ol-3,11,20-trione 21-acetate (using carbethoxy hydrazine).*—Cortisone-21-acetate biscarbethoxy hydrazone (1.5 g.) and 1.5 g. zinc chloride were heated on the steam bath for one hour in 20 ml. of acetic acid. At the end of this time, 10 ml. of water and 2 ml. of pyruvic acid were added and heating continued for 2 hours. The bulk of the solvent was removed in vacuo and the residue diluted with 100 ml. of chloroform and transferred to a separatory funnel. Sodium bicarbonate solution was added to neutrality and the chloroform layer separated. The aqueous phase was re-extracted with chloroform. The chloroform extract was dried and concentrated in vacuo and flushed with methanol. The dry residue was acetylated overnight at room temperature with 4 ml. of pyridine and 2 ml. of acetic anhydride. The reagents were removed in vacuo, the residue dissolved in chloroform and washed with 10% hydrochloric acid, water and sodium bicarbonate solution. The dried chloroform solution was concentrated in vacuo and flushed with methanol. Addition of a few drops of methanol produced crystals, M.P. 178–185, essentially pure pregna-4,16-dien-21-ol-3,11,20-trione 21-acetate.

EXAMPLE 12

*9α fluoropregna-4,16-dien-21-ol-3,11,20-dione 21 - acetate.*—9α fluoropregna-4-ene 11β,17α,21-triol-3,11,20-trione 21-acetate bis-semicarbazone (1 g.) was heated on the steam bath for 4 hours with 1 g. zinc chloride in 30 ml. acetic acid. The reaction mixture was diluted with 15 ml. of water and 7.5 ml. of pyruvic acid and allowed to stand overnight at room temperature. It was diluted with water and extracted with chloroform. The chloroform extract was washed with sodium bicarbonate solution, dried and concentrated in vacuo. Chromatography of the residue indicated the product to be $\Delta^{16}$ steroid in addition to some unreacted starting material.

This application is a continuation-in-part of our application Ser. No. 619,941, filed on November 2, 1956, now abandoned, having this same title.

What is claimed is:

1. In a process for preparing a $\Delta^{16}$-20-keto pregnene compound of the formula:

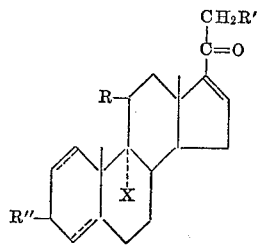

wherein R' is a member selected from the group consisting of H, OH and acyloxy; R is a member selected from the group consisting of —H, —OH and =O; R'' is a member of the group consisting of lower acyloxy and =O; X is a member selected from the group consisting of —H and halogen and wherein the 1,2 and 4,5-carbon to carbon linkages are selected from the group consisting of single bonds, 4,5-double bonds and 1,2:4,5- double bonds, the steps which comprise combining the corresponding 17α-hydroxy-20-keto pregnane compound with a hydrazine to form the corresponding 20-hydrazone and derivative, then combining said 20-hydrazone derivative with an acidic dehydrating agent in the presence of a lower aliphatic acid at a temperature between about 10° C. and 150° C. to remove water and produce the corresponding $\Delta^{16}$-20-hydrazone derivative.

2. The process according to claim 1 in which the dehydrating agent is zinc chloride.

3. The process according to claim 1 in which the dehydrating agent is boron trifluoride.

4. The process according to claim 1 in which the dehydrating agent is para toluenesulfonic acid.

5. The process according to claim 1 in which the dehydrating agent is aluminum chloride.

6. The process according to claim 1 in which the dehydrating agent is acetic acid.

References Cited in the file of this patent
UNITED STATES PATENTS

| | | |
|---|---|---|
| 2,727,909 | Colton | Dec. 20, 1955 |
| 2,777,864 | Bernstein | Jan. 15, 1957 |
| 2,966,504 | Taub et al. | Dec. 27, 1960 |

OTHER REFERENCES

"Natural Products Related to Phenanthrene," Fieser and Fieser (1949), Reinhold Publishing Corporation, pages 277–278.